J. B. EDWARDS.
TELEPHONE TRANSMITTER.
APPLICATION FILED MAY 5, 1905.
909,566. Patented Jan. 12, 1909.
2 SHEETS—SHEET 1.
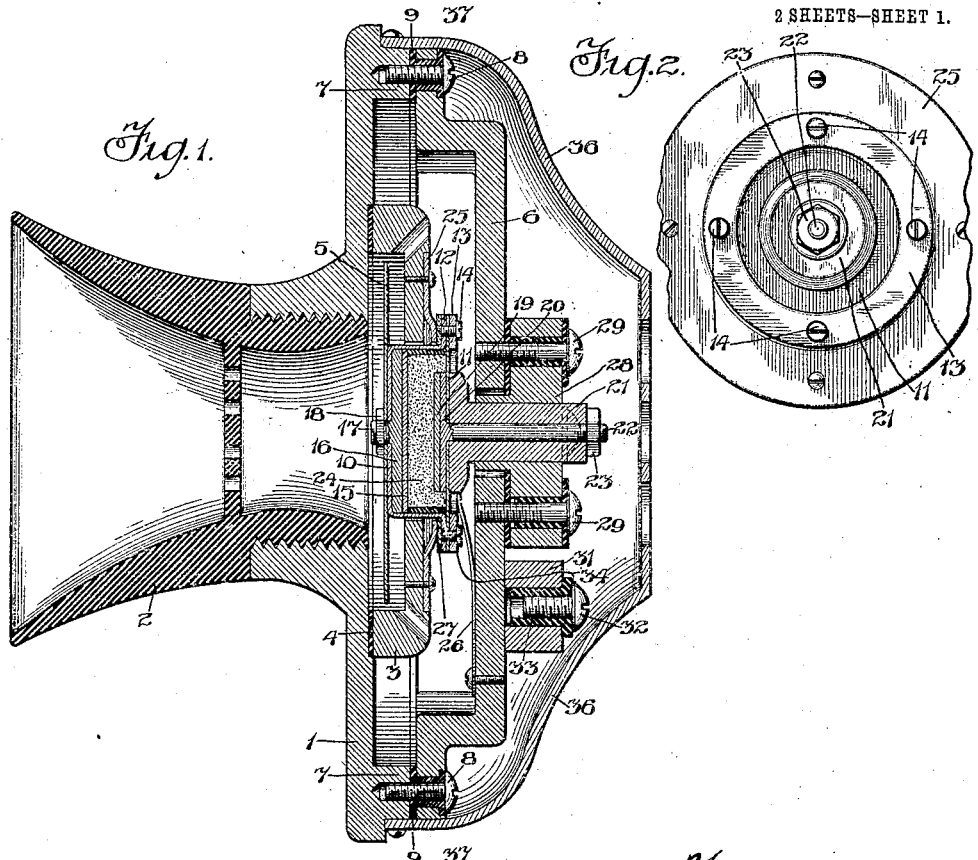
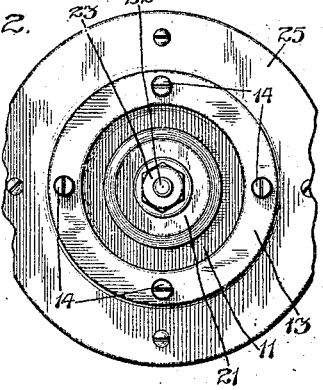
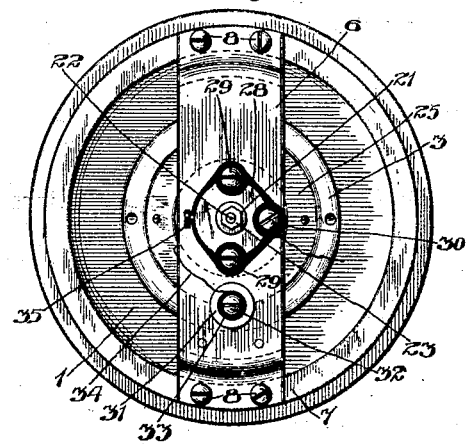
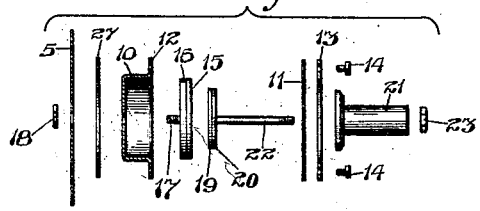
Witnesses:
Emil E. Wertmann
E. F. Grier
Inventor:
Joseph B. Edwards
By Curtis B. Camp
Atty.

J. B. EDWARDS.
TELEPHONE TRANSMITTER.
APPLICATION FILED MAY 5, 1905.
909,566.
Patented Jan. 12, 1909.
2 SHEETS—SHEET 2.
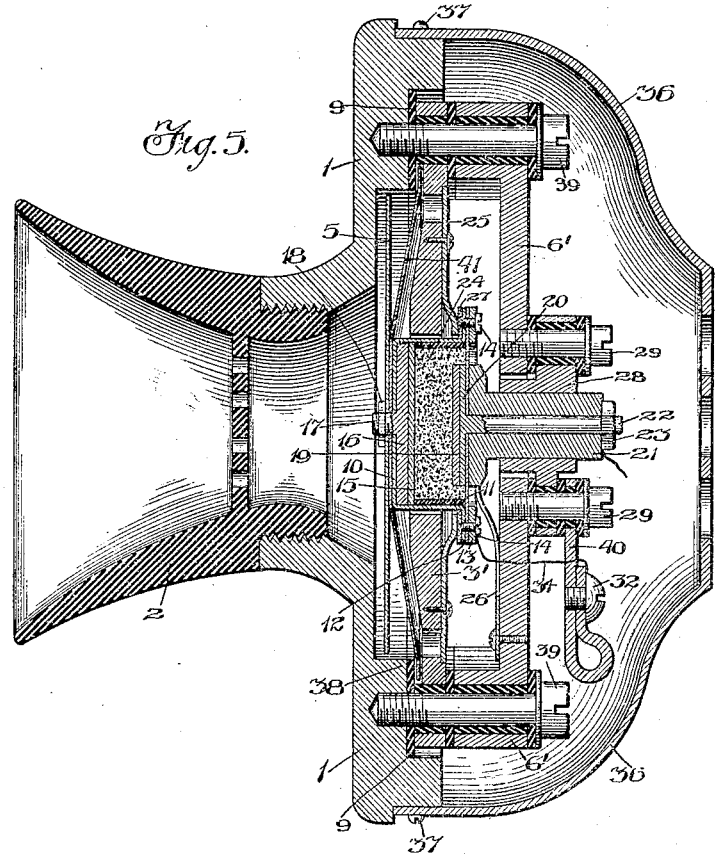
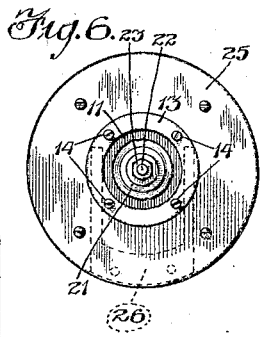
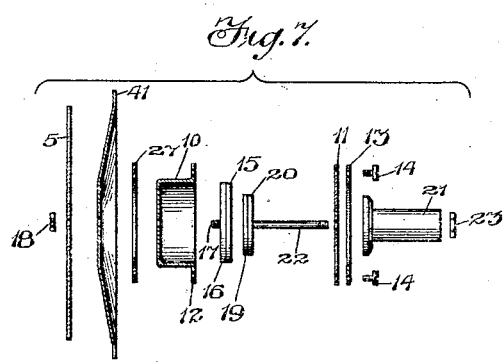
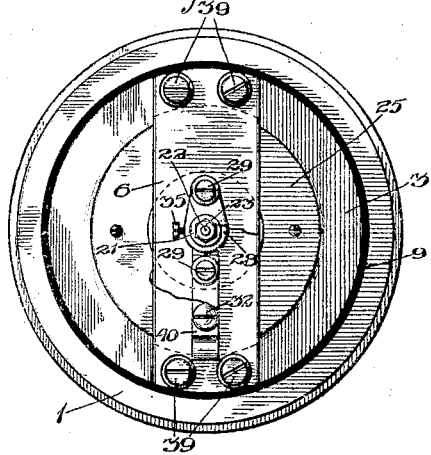
Witnesses:
Emil E. Dertmann
E. F. Grier
Inventor:
Joseph B. Edwards
By Curtis B. Camp
Atty.

UNITED STATES PATENT OFFICE.

JOSEPH B. EDWARDS, OF CHICAGO, ILLINOIS, ASSIGNOR TO KELLOGG SWITCHBOARD & SUPPLY COMPANY, OF CHICAGO, ILLINOIS, A CORPORATION OF ILLINOIS.

TELEPHONE-TRANSMITTER.

No. 909,566.        Specification of Letters Patent.        Patented Jan. 12, 1909.

Application filed May 5, 1905. Serial No. 258,989.

*To all whom it may concern:*

Be it known that I, JOSEPH B. EDWARDS, a citizen of the United States of America, and resident of Chicago, county of Cook, and State of Illinois, have invented a new and useful Improvement in Telephone-Transmitters, of which the following is a specification.

My invention relates to telephone transmitters and has for one of its objects the provision of a transmitter in which the usual large, flexible diaphragm is omitted, and in which improved means are used, upon and against which the sound waves are adapted to impinge.

A further object of my invention is a novel method of securing the chamber for the resistance-varying medium in position, and a novel arrangement of the coöperating parts of said chamber.

The other improved features of my invention will more clearly appear from the following dscription of the drawings, which illustrate modifications of my transmitter which I have worked out for the purpose of disclosing the underlying principles of my invention, and in which:

Figure 1 represents a sectional view of a transmitter embodying one form of my invention; Fig. 2 is a rear view of the chamber or recess for the resistance-varying material showing parts of the transmitter broken away and with portions thereof removed; Fig. 3 is a rear view of the transmitter with the rear-inclosing casing removed and drawn to a smaller scale; Fig. 4 is a view of the working parts of the transmitter disassembled and drawn to a reduced scale; Fig. 5 is a sectional view of another form of my invention; Fig. 6 is a rear view of the chamber for the comminuted conducting material showing the spring 26 in engagement therewith; Fig. 8 is a rear view of the form shown in Fig. 5 with the inclosing casing removed and drawn to a reduced scale; Fig. 7 is a view of the working parts of the transmitter disassembled.

In the preferred form of my invention I provide a front plate 1 within a central aperture in which a suitable mouth-piece 2 is adapted to be secured in the usual manner; a bridge plate 3 is adapted to rest upon the inner face of the main plate 1 and is preferably insulated therefrom by an insulating ring 4 or in any suitable manner and is held in position by the pressure of springs 25. The plate 3 is shown as consisting of an annular cup-shaped member, the forwardly-extending rim or flange of said member being adapted to rest upon the insulating material 4, said flange forming a suitable housing for the main diaphragm 5. Any other form of the plate 3 may be adopted in lieu of that shown. A second bridge piece or supporting plate 6 is adapted to rest preferably upon the shoulders 7, 7, formed upon the inner surface of the main plate 1, and is secured thereto in the present instance by the screws 8, 8, insulating material 9 being preferably disposed between the plate 1 and the ends of the supporting plate or bridge 6.

A recess or chamber 10 is preferably formed of thin sheet metal and is adapted to be closed upon one side by a small flexible diaphragm 11 of mica, parchment or other suitable material. In practice I prefer to secure the periphery of the flexible diaphragm 11 between the flange 12 formed upon the chamber or recess 10, and a ring 13, the periphery of said diaphragm being secured between said flange and ring by small screws 14, 14. An electrode 15, preferably of carbon, is secured within the chamber 10, said electrode in the present instance being electroplated and soldered to a metallic plate or support 16. The plate 16 has a centrally-disposed pin 17 formed thereon, adapted to project through the forward wall of the chamber 10 and adapted to receive a nut 18 adapted to clamp the electrode 15 within the chamber 10, said pin being also adapted to securely clamp the diaphragm 5 rigidly upon the chamber or recess 10. A similar electrode 19, similarly carried upon a plate 20, is disposed upon the inner face of the flexible diaphragm 11 and is adapted to be clamped in position thereon by means of a suitable block 21, and an extended end of the pin 22 extending through said block and adapted to receive the nut 23. Any suitable comminuted conducting material 24, such as carbon granules, may be disposed between the electrodes 15 and 19, and is adapted to vary the resistance of the current passing therethrough to create voice currents in the well-known manner. While I have described the construction of the chamber 10 and the arrangements of the parts secured thereto in detail, it will be understood that the construction described may be varied as to such details, and that my invention is not limited to the construction and arrangement of such parts as shown and described but contemplates any suitable construction thereof.

A suitable spring 25 is carried by the supporting plate 3, said spring being shown as a ring having an inner rearwardly deflected edge, said edge being adapted to engage the chamber 10, and to coöperate with a spring 26, secured to the bridge or supporting plate 6, the free end of said last-mentioned spring being also adapted to engage the chamber 10, said chamber being secured in position between said springs 25 and 26. A ring of felt, 27, may be disposed between the chamber 10 and spring 25, but this is not essential. Carried upon the plate or bridge-piece 6 is a block 28, secured thereto by screws 29, said screws being insulated from said block and engaging the bridge 6, said block being also insulated from said bridge plate as shown. A binding screw 30 is carried by the block 28 (see Fig. 3) and constitutes one side of the circuit of the transmitter. Also preferably mounted upon the plate 6 is a block 31 carrying an insulating bushing 33 and a binding screw 32 adapted to engage a conductor 34, said binding screw constituting a terminal for the other side of the transmitter circuit. The circuit of the transmitter extends from the binding post 30 through the block 28 and the pin 22 to the rear electrode 19, through the comminuted conducting material 24 to the front electrode 15 and thence through the chamber 10 to the binding screw 32 by means of a conductor 34 secured to said chamber in any suitable manner. A set screw 35 (Fig. 3) is threaded into the block 28 and is adapted to engage the post 21, said set screw being adapted to secure the rear electrode 19 in an adjusted position within the block 28. The rear electrode 19 and the chamber 10 is first adjusted in position between the opposite free ends of the springs 25 and 26 and is then secured in such adjusted position by means of the set screw 35. A metallic inclosing casing 36 is provided for the rear portion of the transmitter, said casing being adapted to inclose the interior parts thereof, the rear face of said casing being adapted to secure the transmitter to a suitable transmitter arm or other support, and having apertures therein for the leading-in wires. The casing 36 may be secured to the transmitter in any suitable manner as by the screws 37, 37.

It will be noted that the diaphragm 5 is preferably a rigid non-flexible diaphragm, consisting of a circular disk of sheet metal and shown mounted directly upon the chamber 10, but said diaphragm may be associated with said chamber or one of the electrodes thereof in any suitable manner. The diaphragm in the present instance is free about its periphery, from the other parts of the transmitter, and is adapted to present an enlarged surface to the incoming sound waves against which the sound waves may impinge. The rigid diaphragm obviates the necessity for the use of the usual large flexible diaphragm, the periphery of which is ordinarily adapted to engage a part of the transmitter frame, said periphery carrying resilient material between which resilient material and dampening springs, adapted to engage the body of the diaphragm, the diaphragm is usually adjusted, in order to impart thereto the proper degree of flexibility. No adjustment of any kind of the large diaphragm adapted to receive the sound waves is necessary in my improved transmitter, the proper variations of resistance in the comminuted conducting material being obtained entirely by adjusting the small flexible diaphragm 11 between the springs 25 and 26, as above described, said adjustment being maintained by means of the set screw 35.

In Figs. 5 to 8, inclusive, I have illustrated another form of my invention in which the bridge plate 3' consists of a bar or a strip resting upon shoulders 38 carried upon the interior surface of the plate 1, the bridge plate 6' being adapted to rest upon the ends of said bridge 3', and being secured thereto, and to the plate 1 by means of screws 39, 39, said screws being insulated therefrom, and from the plate 3' by suitable insulating material, as shown. The binding post 32 is carried by one of the screws 29, adapted to secure the block 28 in position, said binding screw being carried upon a metallic strip 40, said strip being secured in position by and insulated from the screw 29, as shown in Fig. 5. A disk of oiled paper 41 is preferably secured in position between the chamber 10 and the diaphragm 5, the edge of said disk being disposed between the plate 1 and the bridge piece 3', said disk being adapted to exclude dust and particles of dirt from the interior of the transmitter.

While I have illustrated but two modifications of my invention it will be understood that many commercial forms thereof may be devised and that I do not wish to limit the principle of my invention to the modifications herein shown and described.

What I claim as new and desire to secure by Letters Patent is:

1. In a telephone transmitter, the combination with a granule containing chamber, of a diaphragm supported thereby and vibratory therewith as a whole, a flexible diaphragm forming the rear wall of said chamber, other resilient means supporting said chamber, a stationary electrode and a movable electrode within the chamber, the vibration of the chamber being adapted to agitate the granules therein to prevent packing, substantially as described.

2. In a telephone transmitter, the combination with a vibratory chamber, of resilient means holding said chamber in place, a diaphragm centrally supported by said chamber and free at its periphery, a stationary electrode and a movable electrode within the chamber, and a second diaphragm closing the rear of the chamber, substantially as described.

3. In a telephone transmitter, the combination with a suitable chamber adapted to contain comminuted conducting material, of a flexible diaphragm adapted to inclose the open end of said chamber, a suitable electrode associated with said diaphragm, a non-flexible diaphragm associated with the opposite end of said chamber, a pair of springs, said chamber and said diaphragm being adapted to be adjusted in position between the oppositely deflected ends of said springs, and means for securing said parts in adjusted position, substantially as described.

4. In a telephone transmitter, the combination with a chamber, of a diaphragm adapted to form a flexible wall for said chamber, comminuted conducting material within said chamber, a pair of oppositely deflected springs said chamber and said diaphragm being resiliently mounted between the deflected ends of said springs, substantially as described.

5. In a telephone transmitter, the combination with a suitable chamber or recess adapted to contain comminuted conducting material, of a flexible diaphragm adapted to inclose the open end of said chamber, a suitable electrode associated with said diaphragm, a non-flexible diaphragm, against which the sound waves are adapted to impinge, associated with said chamber, a pair of oppositely deflected springs said chamber and said diaphragm being resiliently mounted between the ends of the said springs, substantially as described.

Signed by me at Chicago, county of Cook, and State of Illinois, in the presence of two witnesses.

JOSEPH B. EDWARDS.

Witnesses:
C. P. BELDEN,
E. M. KING.